Aug. 25, 1925.
E. L. FORD
1,551,528
VENTILATOR FOR PASSENGER VEHICLES
Original Filed Sept. 11, 1922
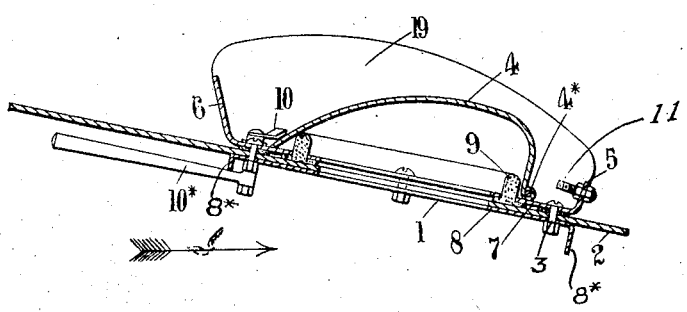
INVENTOR
Ernest Leonard Ford
per Robert S. Phillips
Attorney.

Patented Aug. 25, 1925.

1,551,528

UNITED STATES PATENT OFFICE.

ERNEST LEONARD FORD, OF DARLINGTON, ENGLAND.

VENTILATOR FOR PASSENGER VEHICLES.

Original application filed September 11, 1922, Serial No. 587,486. Divided and this application filed June 7, 1924. Serial No. 718,675.

*To all whom it may concern:*

Be it known that I, ERNEST LEONARD FORD, a subject of the King of Great Britain and Ireland, residing at Honeypot Works, Honeypot Lane, Darlington, in the county of Durham, England, have invented certain new and useful Improvements in Ventilators for Passenger Vehicles, of which the following is a specification.

This invention relates to ventilators for passenger vehicles of the closed or partially closed type and consists of a modification of the ventilator forming the subject matter of my application Serial No. 587,486, filed 11th September, 1922, the object being to provide a ventilator the valve of which will open automatically when the vehicle moves forward by reason solely of the flow of air over it. The present application is a division of the aforementioned application Serial No. 587,486, filed September 11, 1922.

I attain this end by the device shown in the accompanying drawings, in which the figure is a view in cross section showing the basic form of this invention.

The device comprises a frame 7 adapted to be secured to the roof 2 of the body of the vehicle and having an aperture adapted to register with an aperture 1 in said roof—a flap valve 4 pivoted at $4^x$ to the front edge of the apertured frame and adapted to close the aperture 1 in the roof, said valve having its exterior upper surface cambered with a greater convexity of its forward or hinged end. By shaping the valve in this manner the flow of air over it set up by the forward motion of the vehicle in the direction shown by the arrow creates a negative pressure at its rear which causes the valve to open automatically. To increase this negative pressure a vertical or approximately vertical plate forming a screen 5 may be provided in advance of the valve 4. At the rear of said valve another plate 6 forming a rear screen may be provided to prevent any back flow of air from the rear of the vehicle passing through the aperture 1 into the body of the vehicle, either when the vehicle is at rest or when there is a following wind of a greater velocity than the speed at which the vehicle is travelling. These two plates may conveniently be made in one piece with the frame 7. The height of the forward screen 5 is preferably less than that of the rear screen 6. The apertured frame 7 is secured to the roof of the body of the vehicle by means of bolts 3 and when said roof is a flexible one an underplate 8 having stiffening flanges $8^x$ may be employed and secured in position by the bolts 3. To enable the valve 4 to be kept permanently closed a latch 10, provided with a suitable handle $10^x$, is mounted on the apertured frame and is adapted to be operated to engage the valve as shown in the accompanying drawing.

To prevent the valve lifting too far an adjustable stop 11 may be mounted on the screen 5.

To prevent air from flowing over the sides of the valve or through same when the valve is open—which would tend to reduce or destroy the negative pressure which causes the valve to open and remain open—side plates or shields 19 may be mounted on the apertured frame 7.

When the vehicle fitted with this ventilator moves in a forward direction the flow of air over the valve creates, by reason of its exterior shape, such a negative pressure at the rear of the valve as will cause it to automaticaly open, remain open and automatically exhaust the air from the body of the vehicle.

What I claim is:—

1. A ventilator for closed or partially closed vehicles, comprising an apertured frame adapted to be mounted on the roof of the body of the vehicle so that its aperture registers with an aperture in said roof, a flap valve mounted on said frame the exterior shape of said valve being such that the flow of air over it due to the forward movement of the vehicle will cause said valve to open automatically, and a screen mounted on the apertured frame in front of said valve.

2. A ventilator for closed or partially closed vehicles, comprising an apertured frame adapted to register with an aperture in the roof of the body of the vehicle, a valve mounted on said frame exterior to the roof of the body of the vehicle the exterior upper surface of said valve being cambered with a greater convexity at its forward or hinged end, and a screen mounted on the apertured frame in front of said valve.

3. An automatic ventilator for closed or partially closed bodies of vehicles, comprising an apertured frame adapted to register with an aperture in the roof of the body of the vehicle, a flap valve having its upper and exterior surface of convex form hinged to said frame at the forward edge of the aperture therein, and a screen mounted on the apertured frame in front of said valve and means for locking said valve in its closed position.

4. An automatic ventilator for closed or partially closed bodies of vehicles, comprising an apertured frame mounted on the roof of the body of the vehicle so that its aperture registers with an aperture in the roof of the body of the vehicle, a convex shaped flap valve hinged to the said frame at the forward edge of the aperture therein, and a screen mounted on the apertured frame in front of said valve for the purpose of increasing the negative pressure at the rear of said valve.

5. An automatic ventilator for the closed or partially closed bodies of vehicles comprising an apertured frame adapted to be fixed to the roof of the body of the vehicle and register with an aperture in same, a convex shaped flap valve hinged to said apertured plate and a screen mounted on the apertured frame in front of said valve and a shield mounted on said apertured plate on each side of said valve for the purpose of preventing the reduction or destruction of the negative pressure at the rear of said valve.

6. The combination with a closed or partially closed body for vehicles of an apertured frame comprising two apertured plates adapted to be fixed to the exterior and interior of the roof of the vehicle so that the apertures in same register with an aperture in said roof, and a curved flap valve hinged to the exterior plate of said frame at the forward edge of the aperture therein and a screen mounted on the apertured frame in front of said valve.

7. The combination with a closed or partially closed body for vehicles, of an apertured frame comprising two apertured plates adapted to be fixed to the roof of the vehicle and register with an aperture in said roof, a curved flap valve hinged to the exterior plate of said frame at the forward edge of the aperture therein and a screen mounted on the apertured frame in front of said valve, and side shields mounted on the exterior plate of said apertured frame for the purpose of preventing the reduction or destruction of the negative pressure at the rear of the valve.

8. The combination with a closed or partially closed body for vehicles, of an apertured frame comprising two apertured plates adapted to be fixed to the roof of the vehicle and register with an aperture in said roof, a curved flap valve hinged to the exterior of said frame at the forward edge of the aperture therein, and a screen mounted on the apertured frame in front of said valve and means for locking said valve in its closed position mounted on said apertured frame.

9. The combination with a closed or partially closed body for vehicles, of an apertured frame comprising two apertured plates adapted to be fixed to the roof of the vehicle and register with an aperture in said roof, a curved flap valve hinged to the exterior plate of said frame at the forward edge of the aperture therein and a screen mounted on the apertured frame in front of said valve, a device mounted on the apertured frame for locking said valve in its closed position, and side shields mounted on said apertured frame for the purpose of preventing an inflow of air at the sides of the valve.

ERNEST LEONARD FORD.